(12) United States Patent
Sakazaki et al.

(10) Patent No.: US 7,568,505 B2
(45) Date of Patent: *Aug. 4, 2009

(54) FUEL HOSE

(75) Inventors: Kazushige Sakazaki, Komaki (JP);
Kentaro Sugita, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/044,219

(22) Filed: Mar. 7, 2008

(65) Prior Publication Data

US 2008/0230136 A1    Sep. 25, 2008

(30) Foreign Application Priority Data

Mar. 23, 2007  (JP)  .............................. 2007-076049
Dec. 28, 2007  (JP)  .............................. 2007-341482
Feb. 25, 2008  (JP)  .............................. 2008-043400

(51) Int. Cl.
*F16L 11/00* (2006.01)

(52) U.S. Cl. ........................ 138/126; 138/137; 138/140; 138/177; 138/141; 428/36.91

(58) Field of Classification Search ................. 138/137, 138/140, 141, 126, DIG. 1, DIG. 3; 428/36.91
See application file for complete search history.

(56) References Cited

U.S. PATENT DOCUMENTS

| | | | |
|---|---|---|---|
| 4,559,973 A * | 12/1985 | Hane et al. ................... 138/138 |
| 5,284,184 A * | 2/1994 | Noone et al. ................. 138/121 |
| 5,383,087 A * | 1/1995 | Noone et al. ................. 361/215 |
| 5,518,035 A * | 5/1996 | Hoshishima et al. ........ 138/109 |
| 5,743,304 A * | 4/1998 | Mitchell et al. ............. 138/137 |
| 5,941,286 A * | 8/1999 | Fauble et al. ................. 138/137 |
| 6,261,657 B1 | 7/2001 | Ainsworth et al. |
| 6,378,562 B1 * | 4/2002 | Noone et al. ................. 138/137 |
| 6,823,898 B1 * | 11/2004 | Nie et al. ..................... 138/137 |
| 2004/0118469 A1 * | 6/2004 | Wilson et al. ............... 138/137 |
| 2007/0227605 A1 | 10/2007 | Sakazaki et al. |
| 2007/0227607 A1 | 10/2007 | Sakazaki et al. |
| 2007/0227610 A1 | 10/2007 | Sakazaki |

FOREIGN PATENT DOCUMENTS

| | | |
|---|---|---|
| JP | 8108499 | 4/1996 |
| JP | 1190993 | 4/1999 |
| JP | 200254779 | 2/2002 |
| JP | 2007292303 | 11/2007 |

* cited by examiner

*Primary Examiner*—Patrick F Brinson
(74) *Attorney, Agent, or Firm*—Andrus, Sceales, Starke & Sawall, LLP (57) ABSTRACT

A fuel hose for a fuel pipeline in an motor vehicle has a multilayer structure including a resin barrier layer having low permeability to fuel, an outer rubber layer laminated on an outer side of the barrier layer and an inner rubber layer laminated on an inner side of the barrier layer and defining an inner surface layer of the fuel hose. The multilayer structure is formed throughout an entire length of the fuel hose. A rubber hardness of the inner rubber layer is higher than a rubber hardness of the outer rubber layer.

6 Claims, 8 Drawing Sheets

FUEL HOSE

BACKGROUND OF THE INVENTION

1. Field of the Invention

The present invention relates to a fuel hose that includes a resin barrier layer having low permeability to fuel in a middle in a radial direction or in a cross-section thereof and transports a fuel, for example, a filler hose of a resin-rubber composite for transporting a fuel to a fuel tank.

2. Description of the Related Art

In a filler hose adapted for transporting a fuel injected in a fuel inlet to a fuel tank in a motor vehicle, a typical rubber hose made of a blend of acrylonitrile-butadiene rubber and polyvinyl chloride (NBR/PVC blend, NBR+PVC) or the like has been conventionally used. Such rubber hose of NBR+PVC has a high vibration-absorbability, easiness of assembly, and a relatively excellent low permeability to fuel (gasoline).

However, such typical rubber hose cannot sufficiently meet to requirements for low permeability to fuel, which increase more and more recently.

As a countermeasure against that, developed and used is a filler hose that is a hose of a resin-rubber composite. The filler hose includes a resin layer that is laminated as an inner surface layer on an inner side of an outer rubber layer. The resin layer has an excellent low permeability (permeation resistance) to fuel, and defines a barrier layer.

However, the resin barrier layer is hard since resin is a material harder than rubber. So, in a filler hose including the resin barrier layer laminated on an inner side of the outer rubber layer to an axial end of the hose, when the filler hose is fitted on a mating pipe, sealing performance are insufficient due to poor contact between the mating pipe and the resin barrier layer that defines an inner surface of the hose.

And, since the resin barrier layer defining the inner surface of the filler hose is hard and exhibits a large deformation resistance during fitting of the filler hose on the mating pipe, a great force is required for fitting or slipping the filler hose on the mating pipe. This causes a problem that easiness of connection of the filler hose and the mating pipe is impaired.

Figure 4A:
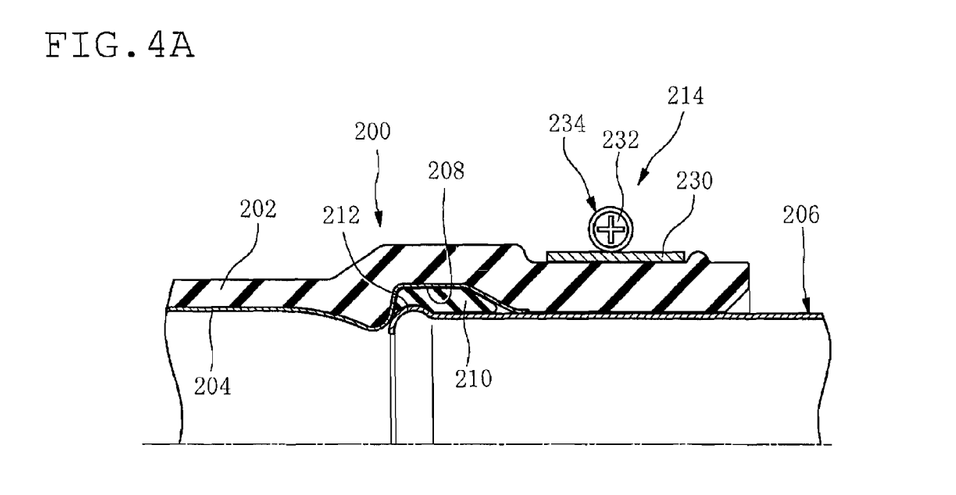
FIG. 4A is a view showing one example of a conventional filler hose.

For the purpose of solution of the problem, a filler hose as shown in FIG. 4 is disclosed in Patent Document 1 as below.

In the Figure, reference numeral 200 indicates a filler hose of a resin-rubber composite, reference numeral 202 indicates an outer rubber layer, and reference numeral 204 indicates a resin barrier layer that is laminated on an inner side of the outer rubber layer 202 as an inner surface layer.

In the filler hose 200, on an end portion thereof to be connected to a mating pipe 206 made of metal, the resin barrier layer 204 is not laminated, and an inner surface of the outer rubber layer 202 is exposed to be fitted on the mating pipe 206 elastically in direct contact relation.

Figure 4B:
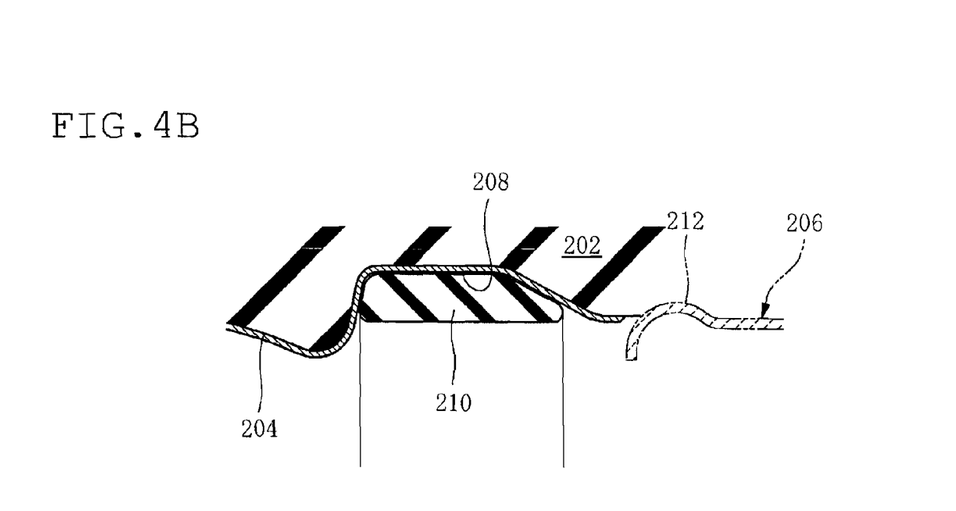
FIG. 4B is a partly enlarged view of the conventional filler hose of FIG. 4A.

And, in order to prevent a problem that a fuel flowing inside penetrates between the exposed inner surface of the outer rubber layer 202 and the mating pipe 206, and permeates outwardly through the end portion of the outer rubber layer 202 on which the resin barrier layer 204 is not laminated, in the filler hose 200, an annular grooved portion 208 is formed in an end portion of the resin barrier layer 204, a ring-shaped elastic sealing member 210 made of a material such as fluoro rubber (FKM) and having low permeability to fuel is attached therein. The filler hose 200 is fitted on the mating pipe 206 so as to elastically contact an inner surface of the elastic sealing member 210 with the mating pipe 206.

A typical filler hose, including that shown in FIG. 4, is connected to and fixed on the mating pipe 206 by a hose clamp 214 that has a threaded tightening mechanism.

Meanwhile, in FIG. 4, reference numeral 212 indicates a bulged portion (bulge portion) bulging annularly in a radially outward direction on a leading end portion of the mating pipe 206. The filler hose 200 is fixed on the mating pipe 206 with the hose clamp 214 tightening radially inwardly an outer peripheral surface of an end portion of the outer rubber layer 202 where the resin barrier layer 204 is not laminated.

Figure 5A:
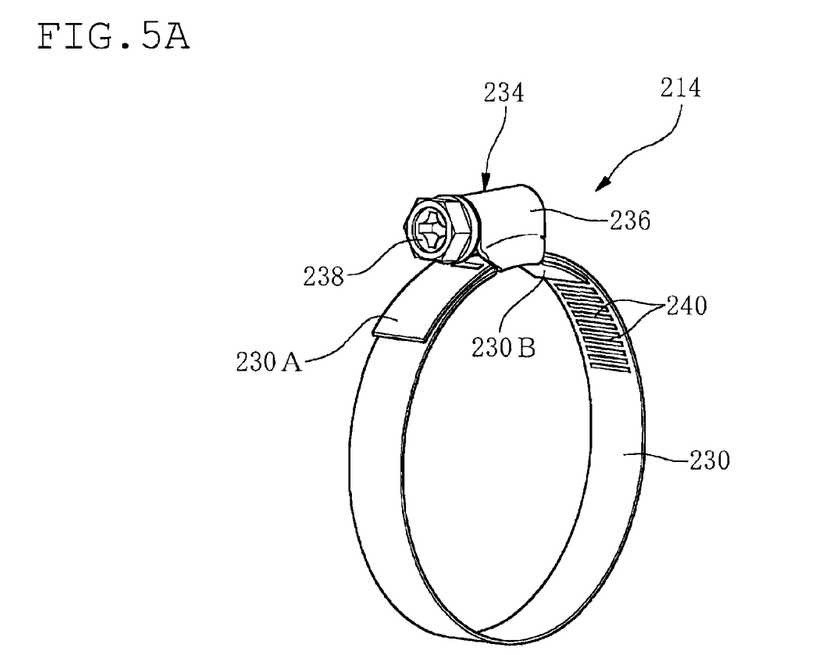
FIGS. 5A and 5B are views of a hose clamp.
Figure 5B:
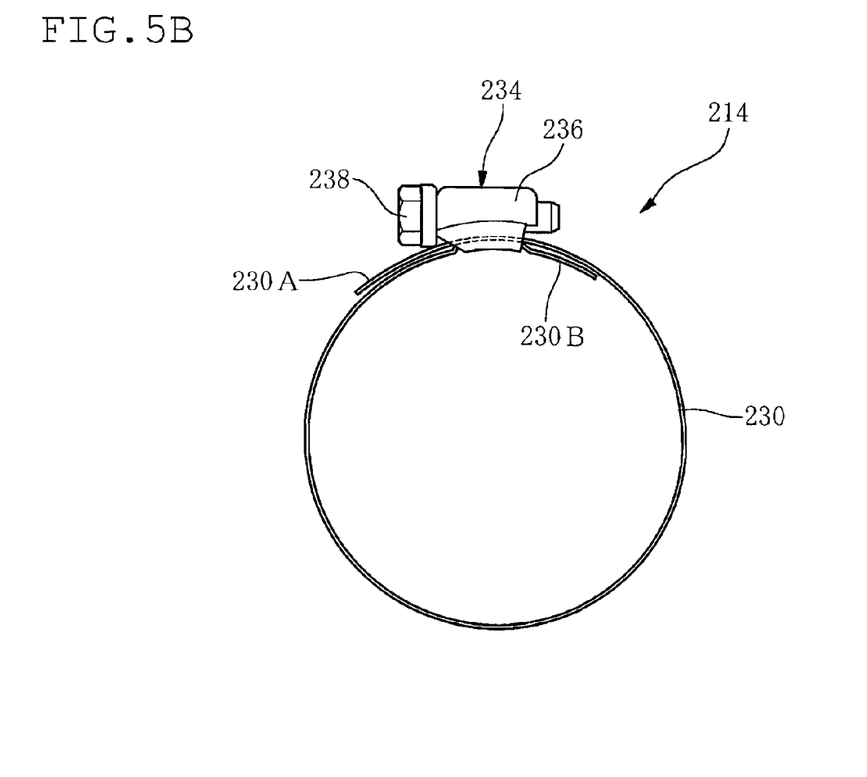

FIG. 5 shows specifically structure of the hose clamp 214.

As shown in the Figure, the hose clamp 214 has a metal tightening band 230 in a form of a strip and a tightening mechanism 234.

The tightening band 230 includes one end portion 230A and the other end portion 230B. The one end portion 230A is formed with slit-like slots, slit-like thread grooves or slits 240 for receiving threads, circumferentially spaced apart at equal pitch. The tightening band 230 is rolled into a ring in such manner that the one end portion 230A with the thread grooves 240 overlaps an outer side of the other end portion 230B, and the screw-operated tightening mechanism 234 is fixed on the other end portion 230B.

The tightening mechanism 234 comprises a housing 236 fixed on the other end portion 230B, and an externally threaded screw 238 including a threaded stud that is rotatably received in the housing 236. Threads of the externally threaded screw 238 fit in and engage with the aforementioned slits 240.

In the case of the hose clamp 214, as the externally threaded screw 238 is rotated, the one end portion 230A is moved counterclockwise circumferentially (in FIG. 5) along the other end portion 230B, by screw feed mechanism, and the tightening band 230 is diametrically contracted to tighten and fix an end portion of the filler hose 200, specifically the outer rubber layer 202 as shown in FIG. 4 on the mating pipe 206.

In the filler hose 200 shown in FIG. 4, the resin barrier layer 204 is not laminated on an end portion of the filler hose 200. Therefore, a resistance of the resin barrier layer 204 is not greatly exerted when the filler hose 200 is fitted on the mating pipe 206, and thereby the filler hose 200 can be fitted thereon easily with a small force.

And, in the end portion of the filler hose 200, the resin barrier layer 204 is not formed, the inner surface of the outer rubber layer 202 having elasticity contacts directly with the mating pipe 206, and good sealing performance can be provided between the mating pipe 206 and a portion of the filler hose 200 fitted thereon.

By the way, the filler hose typically has a predetermined curved shape since the filler hose has to be arranged so as not to interfere with peripheral parts and components.

A typical rubber hose of such curved shape is produced in a following manner as disclosed also in Patent Document 2 as below. A rubber hose body of an elongate straight tubular shape is formed by extrusion, and the rubber hose is cut into a predetermined length to obtain a straight tubular rubber hose 216 (refer to FIG. 6) that is not vulcanized (or is semi-vulcanized). The straight tubular rubber hose 216 is fitted on a metal mandrel 218 that has a predetermined curved shape to be deformed into a curved shape. The curved tubular rubber hose 216 is vulcanized with being fitted on the mandrel 218 by heating for a predetermined period of time. When vulcanization is completed, the hose 220 of curved shape is removed from the mandrel 218, and now the hose 220 of curved shape as a finished product is obtained.

However, in the case of the filler hose 200 as shown in FIG. 4, such production method cannot be employed. In the case of the filler hose 200 as shown in FIG. 4, first of all, the outer rubber layer 202 is solely formed by injection molding, and then the resin barrier layer 204 is formed on the inner surface of the outer rubber layer 202 so as to follow a shape of the inner surface thereof.

For formation of the resin barrier layer 204 so as to follow the shape of the inner surface of the outer rubber layer 202, electrostatic coating means is suitably applied.

The electrostatic coating is applied in such manner that an injection nozzle is inserted into a filler hose, specifically into the outer rubber layer 202, and resin powder is sprayed from the injection nozzle onto an inner surface of the outer rubber layer 202, thereby the inner surface of the outer rubber layer 202 is electrostatically coated or painted with the resin powder.

In the electrostatic coating, a resin membrane is formed in such manner that negatively or positively charged resin powder (typically, negatively charged resin powder) is sprayed from the injection nozzle, and the resin powder flies to and is attached to the inner surface of the outer rubber layer 202 as counter electrode (positive electrode) by electrostatic field.

In steps of such an electrostatic coating, in order to form the resin barrier layer 204 with an intended thickness or wall-thickness, usually, more than one cycles of electrostatic coating are performed.

Specifically, after the resin powder is attached on the inner surface of the outer rubber layer 202, the resin powder is melted by heating and then cooled to form a resin membrane. Then, another resin powder is attached on the resin membrane by further spraying the another resin powder thereto by an electrostatic coating and the another resin powder is melted by heating and then cooled to form another resin membrane. In this manner, the cycle of electrostatic coating is repeated until the resin barrier layer 204 with an intended wall-thickness is formed.

In this case, overall production steps are as follows.

First, the outer rubber layer 202 is formed by injection molding. Then, the outer rubber layer 202 is dried, washed in pretreatment and dried again. Subsequently, resin powder is attached to an inner surface of the outer rubber layer 202 by electrostatic coating. The resin powder thereon is melted by heating and then cooled to form a resin membrane. After that, a second cycle of the electrostatic coating of resin powder, melting of resin powder by heating and cooling and caking of resin powder is performed to form another resin membrane on the resin membrane, and this cycle is repeated up to the required number of times to obtain the resin barrier layer 204 with the intended wall-thickness. After the resin barrier layer 204 is completed, a ring-shaped elastic sealing member 210 having fuel permeation resistance is inserted in a hose through an axial end of the outer rubber layer 202 to be placed in a predetermined position.

As stated above, a number of steps are required for producing the filler hose 200 as shown in FIG. 4, and therefore, production cost of the filler hose 200 is necessarily increased.

Accordingly, the inventors of the present invention devised and proposed in a prior patent application (for example, Japanese Patent Application No. 2006-89387) a filler hose of a resin-rubber composite, having a multilayer structure in which an inner rubber layer is further laminated on an inner side of a resin barrier layer as an inner surface layer.

Figure 7A:
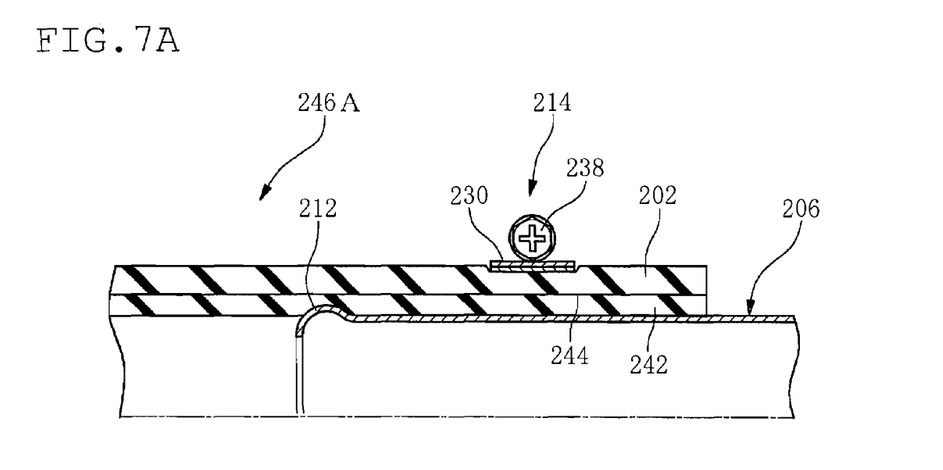
FIG. 7A is a view showing another conventional filler hose.

FIG. 7 shows a specific example of the filler hose. The filler hose 246A of the multilayer structure is provided with low permeability (barrier properties) to a transported fluid by the resin barrier layer 244. Further, an inner rubber layer 242 that defines an inner surface of the filler hose 246A of the resin-rubber composite is elastically deformed when the filler hose 246A is fitted on a mating pipe 206. In this process, a force required for fitting the hose on the mating pipe can be decreased.

And, since the filler hose 246A is connected to the mating pipe 206 so as to elastically contact the inner rubber layer242 with the mating pipe 206, close contact is enhanced therebetween.

And, in the filler hose 246A of the multilayer structure, since the resin barrier layer 244 can be formed throughout to an axial end of the filler hose 246A, an expensive ring-shaped elastic sealing member 210 for providing permeation resistance to a transported fluid as shown in FIG. 4 can be omitted.

Figure 6:
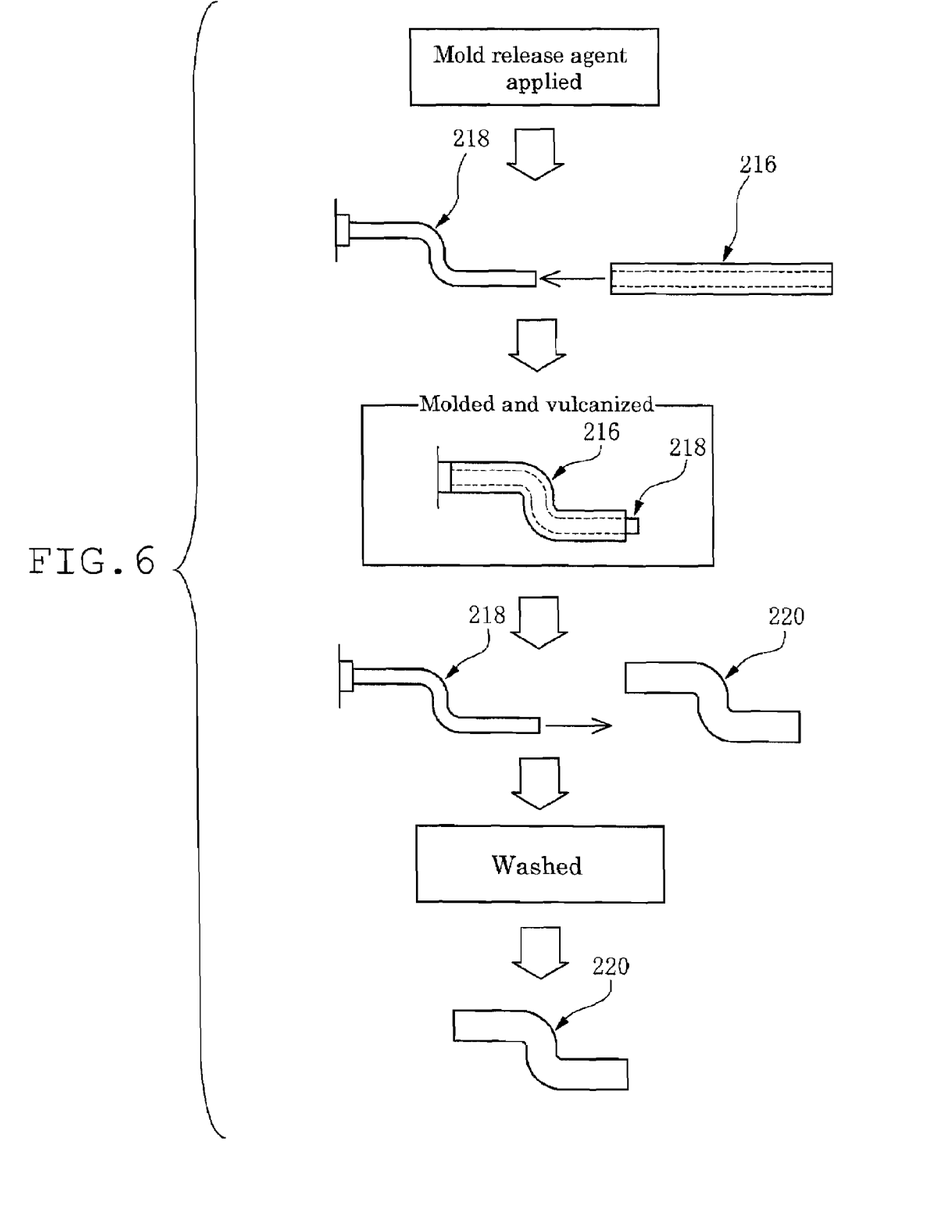
FIG. 6 is a view showing a typical method for producing a conventional hose with curved shape.

In addition, in the filler hose 246A of the multilayer structure, the resin barrier layer 244 can be formed throughout to the axial end of the filler hose 246A. This enables production of the hose 246A in the same production method as shown in FIG. 6.

Specifically, the inner rubber layer 242, the resin barrier layer 244 and the outer rubber layer 202 are laminated on one another by extrusion to form a rubber hose body of an elongate straight tubular shape, and the rubber hose body is cut into a straight tubular rubber hose. Now the straight tubular rubber hose that is unvulcanized or semivulcanized is obtained. Then, the extrudate, namely, the straight tubular rubber hose is fitted on a mandrel that has a predetermined curved shape to be deformed, the deformed tubular rubber hose with being fitted on the mandrel is completely vulcanized, and thereby the filler hose 246A with curved shape can be obtained.

This production method enables production of the fuller hose 246A at much lower cost than before.

By the way, a portion of the filler hose to fit on the mating pipe is designed to have an inner diameter smaller than an outer diameter of the mating pipe for securing connection by fitting an end portion of the filler hose on the mating pipe. Typically, the inner diameter of the end portion of the filler hose is smaller than the outer diameter of the mating pipe by approximately 1 mm to 2 mm. Namely, the end portion of the filler hose has a clamping allowance of approximately 0.5 mm to 1 mm.

A typical hose has an end portion of a single rubber layer. When the end portion of the typical hose is tightened by the hose clamp 214, a tightening force is exerted by the tightening band 230 uniformly throughout an entire circumference of an inner peripheral surface of the end portion of the typical hose, and the inner peripheral surface of the end portion of the typical hose is allowed to have favorable close contact with an outer peripheral surface of the mating pipe 206 throughout an entire circumference thereof. Thereby sufficient sealing performance are ensured between the end portion of the hose and the mating pipe 206.

However, the following problem is found in the filler hose 246A with a rubber-resin-rubber layered structure as shown in FIG. 7. In the filler hose 246A, a middle barrier layer 244 made of hard resin is formed throughout to an axial end of the filler hose 246A. When the filler hose 246A is fitted on the mating pipe 206 and an outer peripheral surface of an end portion of the filler hose 246A is tightened in a diametrically contracting direction by a hose clamp 214 similarly as in FIG. 4 to clamp (lock) the filler hose 246A onto the mating pipe 206 in connected relation, transmission of a clamping force by the hose clamp 214 is disturbed at the middle resin barrier layer 244, resulting that sealing performance cannot be achieved sufficiently as required between the end portion of the filler hose 246A and the mating pipe 26.

Then, the inventors of the present invention investigated the cause of the problem and found the following.

In the hose clamp 214 of a type shown in FIG. 5, when the externally threaded screw 238 is rotated, the one end portion 230A of the tightening band 230 is moved circumferentially along the other end portion 230B by screw feed mechanism, and the tightening band 230 is diametrically contracted.

The hose clamp 214 tightens the end portion of the hose as the tightening band 230 diametrically contracts, closely contacts an inner peripheral surface of the end portion of the hose with an outer peripheral surface of the mating pipe 206, and thereby provides a seal between the hose and the mating pipe 206.

Figure 7B:
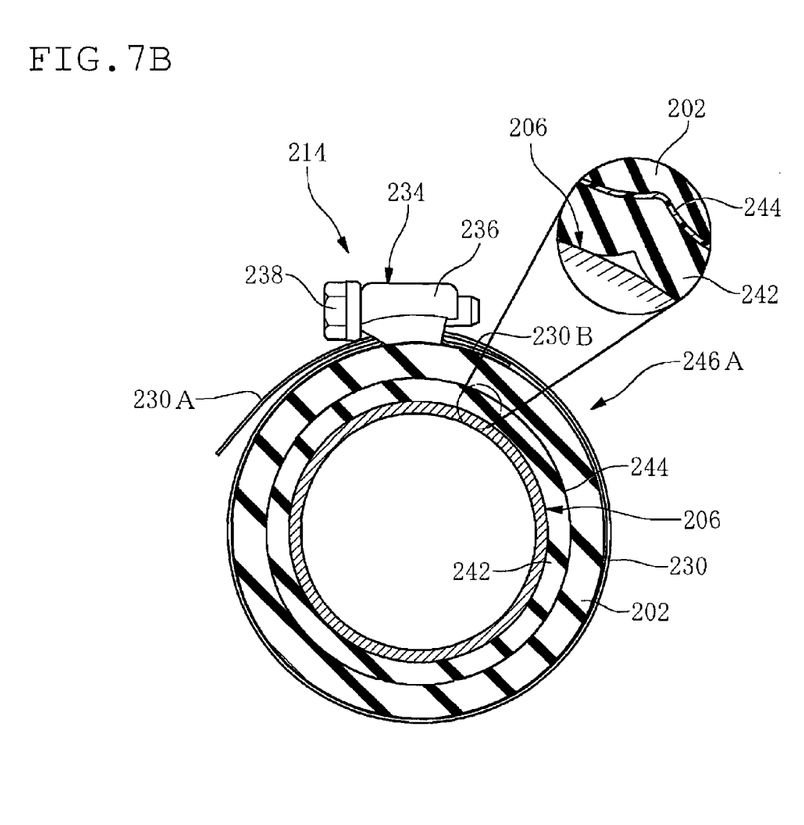
FIG. 7B is a sectional view of the filler hose of FIG. 7A.

However, in the case of the filler hose 246A of the resin-rubber composite including a hard resin barrier layer 244 in the middle in its thickness direction as shown in FIG. 7A, when the tightening band 230 is diametrically contracted to tighten the end portion of the filler hose 246A, an inner peripheral surface of the inner rubber layer 242 separates or rises partly and slightly radially outward from the mating pipe 206 as shown in a fragmentary enlarged view of FIG. 7B, resulting that sealing performance is insufficient in that region.

The cause is thought to be as follows. During diametrical contraction of the tightening band 230 for tightening the end portion of the filler hose 246A, the hard resin barrier layer 244 of the filler hose 246A in the middle in its thickness direction hinders the tightening force from being transmitted sufficiently to the inner rubber layer 242. And, during that time, the resin barrier layer 244 exhibits resistance to deformation in the diametrically contracting direction, a region of the end portion of the filler hose 246A tightened by the tightening band 230 is not diametrically contracted uniformly throughout an entire circumference thereof, a part near the end portion 230B of the tightening band 230 in fixed condition is deformed so as to rise slightly radially outward from the mating pipe. As a result, the sealing performance is partly impaired at the part near the end portion 230B of the tightening band 230 in fixed condition.

Namely, due to the resistance that is provided by the hard resin barrier layer 244 of the filler hose 246A in the middle in its thickness direction to deformation in the diametrically contracting direction, the end portion of the filler hose 246A, specifically the region of the filler hose 246A tightened by the tightening band 230 tends to be into a flat circular shape, and deformation and distortion are concentrated in the part near the end portion 230B of the tightening band 230 in fixed condition. This is thought to result in impaired sealing performance.

[Patent Document 1] JP-A, 2002-54779
[Patent Document 2] JP-A, 11-90993

Under the foregoing circumstances, it is an object of the present invention to provide a fuel hose such as filler hose including a hard resin barrier layer throughout an entire length of the fuel hose or throughout to an axial end of the fuel hose in the middle in a radial direction or thickness direction thereof where sufficient sealing performance is attained when clamped onto a mating pipe by a hose clamp.

SUMMARY OF THE INVENTION

According to the present invention, there is provided a novel fuel hose that is adapted for a fuel pipeline in a motor vehicle or an automobile. The fuel hose comprises a multilayer structure including a resin barrier layer having low permeability to fuel, an outer rubber layer laminated on an outer side of the barrier layer and an inner rubber layer laminated on an inner side of the barrier layer and defining an inner surface layer of the fuel hose. The multilayer structure is formed throughout an entire length of the fuel hose. A rubber hardness of the inner rubber layer is higher or greater than a rubber hardness of the outer rubber layer. The fuel hose is a hose adapted for transporting or conveying a fuel, and for example, a filler hose, a vent hose, an evaporation hose, a breather hose and a purge hose are included in the fuel hoses.

According to one aspect of the present invention, the rubber hardness of the inner rubber layer is higher than the rubber hardness of the outer rubber layer by 10 degrees or more.

According to one aspect of the present invention, the rubber hardness of the inner rubber layer is 70 degrees or higher and the rubber hardness of the outer rubber layer is 75 degrees or lower.

According to the present invention, there is also provided a novel filler hose for transporting a fuel to a fuel tank of a motor vehicle or an automobile. The filler hose comprises a multilayer structure including a resin barrier layer having low permeability to fuel, an inner rubber layer laminated on an inner side of the barrier layer and defining an inner surface layer of the filler hose, and an outer rubber layer laminated on an outer side of the barrier layer. The multilayer structure is formed from one axial end to the other axial end of the filler hose. A rubber hardness of the outer rubber layer is 75 degrees or lower, a rubber hardness of the inner rubber layer is 70 degrees or higher, and the rubber hardness of the inner rubber layer is higher than the rubber hardness of the outer rubber layer by 10 degrees or more.

As stated above, the present invention is direct for a fuel hose that is adapted for a fuel pipeline in a motor vehicle. The fuel hose comprises a resin barrier layer having low permeability to fuel, an outer rubber layer on an outer side of the barrier layer and an inner rubber layer on an inner side of the barrier layer as an inner surface layer of the fuel hose. A multilayer structure of the resin barrier layer, the outer rubber layer and the inner rubber layer is formed throughout an entire length of the fuel hose. A rubber hardness of the inner rubber layer is higher than a rubber hardness of the outer rubber layer, for example, by 10 degrees or more. And, for example, the rubber hardness of the inner rubber layer is 70 degrees or higher and the rubber hardness of the outer rubber layer is 75 degrees or lower. Here, the rubber hardness is measured by a durometer type A (spring scale) according to JIS K6253.

The present invention is also direct to a filler hose. The filler hose comprises a resin barrier layer having low permeability to fuel, an inner rubber layer on an inner side of the barrier layer as an inner surface layer of the filler hose, and an outer rubber layer on an outer side of the barrier layer. The multilayer structure of the resin barrier layer, the outer rubber layer and the inner rubber layer is formed from one axial end to the other axial end of the filler hose. A rubber hardness of the outer rubber layer is 75 degrees or lower, a rubber hardness of the inner rubber layer is 70 degrees or higher, and a rubber hardness of the inner rubber layer is higher than the rubber hardness of the outer rubber layer by 10 degrees or more. Here, the rubber hardness is also measured by a durometer type A (spring scale) according to JIS K6253.

According to the present invention, when the fuel hose or the filler hose is fitted on a mating pipe and an end portion of the hose is tightened by a hose clamp, an inner peripheral surface of the end portion of the hose can be clamped on an outer peripheral surface of the mating pipe in close contact with each other under uniform and required surface pressure throughout an entire circumference thereof, and desired sealing performance can be ensured.

In the present invention, since the outer rubber layer is formed from a soft rubber material that has a low rubber hardness and a high deformability, or the outer rubber layer may be formed from a soft rubber material that has a low rubber hardness and a high deformability, the outer rubber layer is favorably deformed following tightening action of the hose clamp, distortion is prevented from being generated on an outer peripheral surface of the outer rubber layer, and being transmitted to the hard resin barrier layer in the middle in a thickness direction or a cross-section of the hose and the inner rubber layer on the inner side of the resin barrier layer via the outer rubber layer. That is, since the outer rubber layer is diametrically contracted favorably following tightening action of the hose clamp, the outer rubber layer is not dragged largely by the hose clamp that is displaced or moved in a circumferential direction, and thereby a distortion is hardly generated in the inner rubber layer.

As a result, it is allowed to diametrically contract the resin barrier layer in the middle in the thickness direction of the hose and the inner rubber layer on the inner side of the resin barrier layer by the tightening force of the hose clamp uniformly throughout the entire circumference thereof, and to contact closely the inner peripheral surface of the hose, namely, an inner peripheral surface of the inner rubber layer with the outer peripheral surface of the mating pipe uniformly throughout the entire circumference thereof.

Moreover, since the inner rubber layer is formed from a rubber material having a higher rubber hardness compared to the outer rubber layer, when the inner rubber layer is tightened slightly, a high surface pressure can be generated between the outer peripheral surface of the mating pipe and the inner peripheral surface of the inner rubber layer, and the inner rubber layer is allowed to tighten the mating pipe firmly throughout the entire circumference thereof.

Thereby high sealing performance can be ensured between the end portion of the hose and the mating pipe as desired.

Here, the rubber hardness of the inner rubber layer is higher than the rubber hardness of the outer rubber layer by 10 degrees or more. Or the rubber hardness of the inner rubber layer may be higher than the rubber hardness of the outer rubber layer by 10 degrees or more. By the rubber hardness relationship in such manner, it is allowed that the outer rubber layer is soft sufficiently, and the inner rubber layer is hard sufficiently. And, the rubber hardness of the inner rubber layer is 70 degrees or higher and the rubber hardness of the outer rubber layer is 75 degrees or lower. Or, the rubber hardness of the inner rubber layer may be 70 degrees or higher and the rubber hardness of the outer rubber layer may be 75 degrees or lower. The inner rubber layer with rubber hardness of lower than 70 degrees is too soft, and when the end portion of the hose is tightened by the hose clamp, a high surface pressure might not be generated between an inner peripheral surface of the inner rubber layer and an outer peripheral surface of the mating pipe. And, the outer rubber layer with rubber hardness of higher than 75 degrees is too hard, and when the end portion of the hose is tightened by the hose clamp, the outer rubber layer might be dragged largely by the hose clamp that is displaced or moved in the circumferential direction.

A sealing defect resulted from the phenomena as above tends to occur when the end portion of the hose is tightened by a hose clamp of a worm gear type that has a screw-type tightening mechanism and a tightening band as shown in FIG. 5. Therefore, the present invention produces large effects when adapted to a fuel hose (for example, a filler hose) that is clamped on a mating pipe by such a clamp.

In the present invention, the outer rubber layer is formed from a soft elastic rubber material that has a low rubber hardness and a high deformability. Therefore, the hose of the present invention is easily handled and easily assembled. After assembled, an additional effect is that the hose hardly suffers adverse effects of resonance from external components such as an engine, and further, the hose is kept highly safe from damage in a car collision.

Now, the preferred embodiments of the present invention will be described in detail with reference to the drawings.

DETAILED DESCRIPTIONS OF THE PREFERRED EMBODIMENTS

Figure 1:
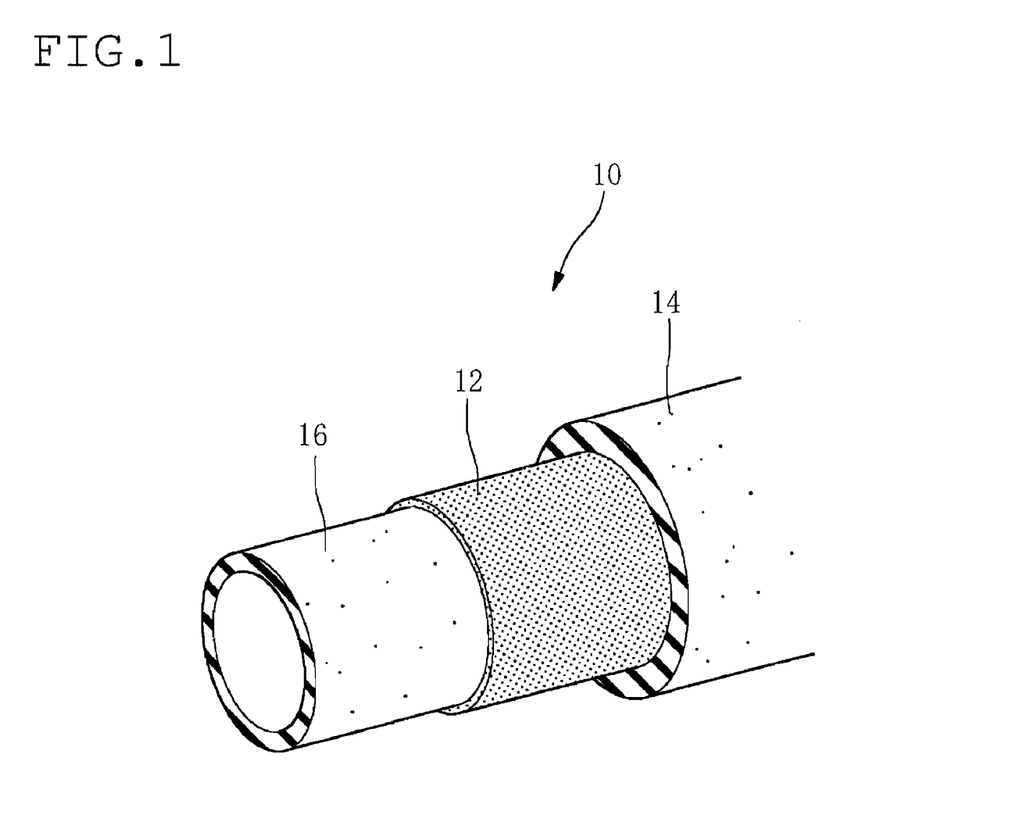
FIG. 1 is a perspective view of a filler hose according to one embodiment of the present invention, shown partly broken away.
Figure 2A:
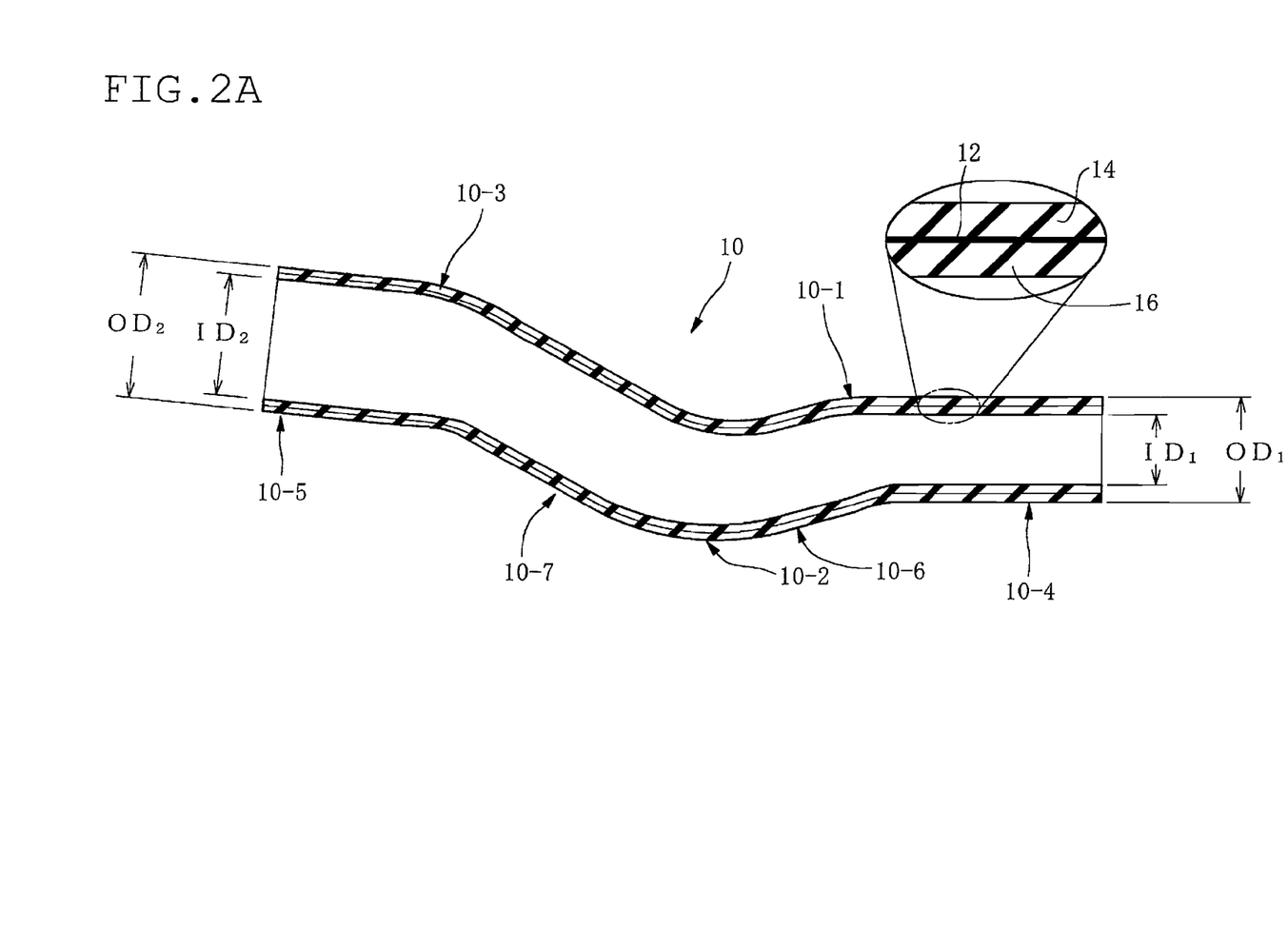
FIG. 2A is an overall sectional view of the filler hose of FIG. 1.
Figure 2B:
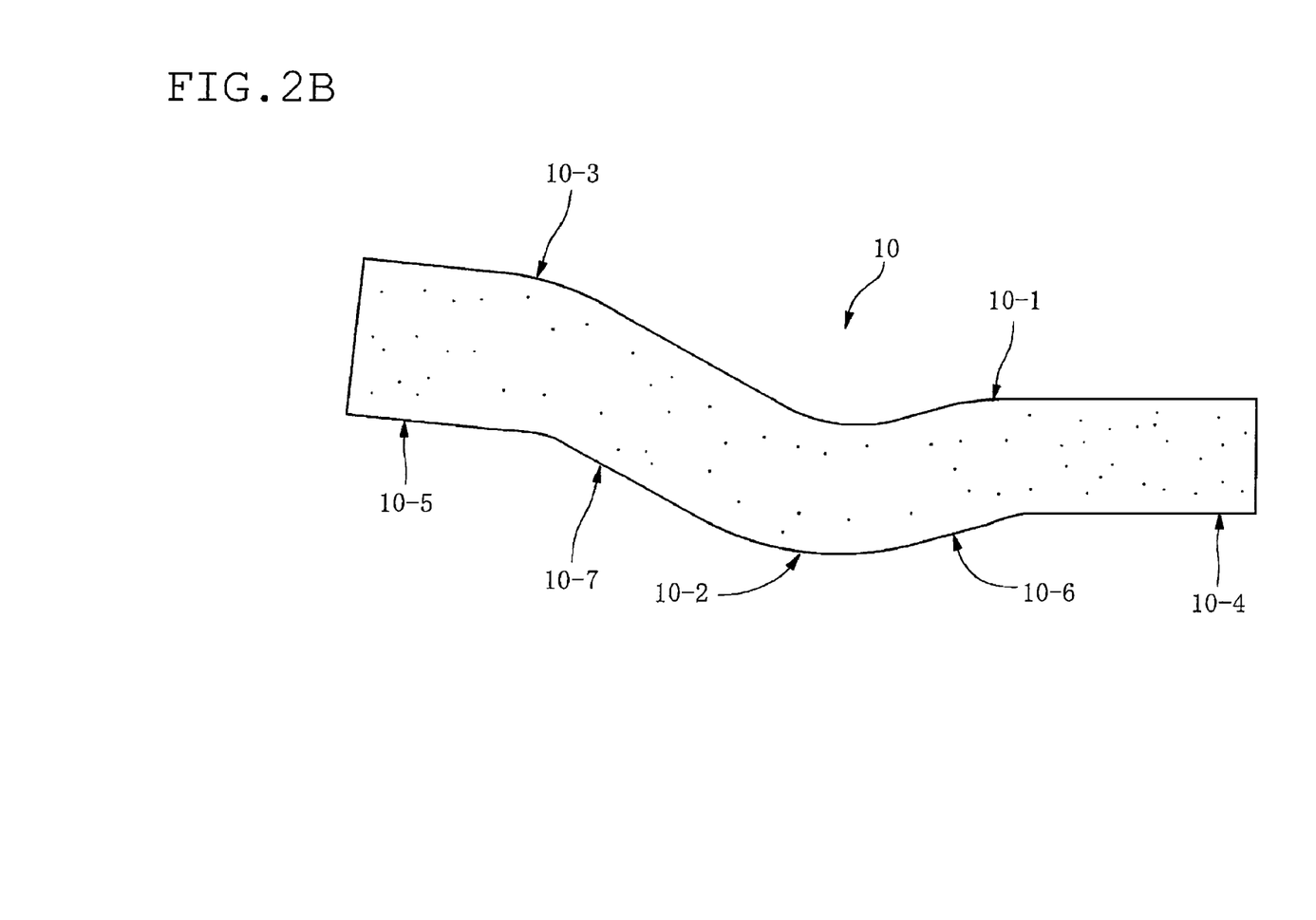
FIG. 2B is an overall front view of the filler hose of FIG. 1.

In FIGS. 1 and 2, reference numeral 10 indicates a filler hose (hereinafter simply referred to as a hose) for transporting a fuel injected in a fuel inlet to a fuel tank in a motor vehicle or an automobile. The hose 10 may be used also as other hose such as a vent hose, an evaporation hose, a breather hose, or a purge hose. The hose 10 comprises a multilayer structure including a resin barrier layer 12 having low permeability to fuel, an outer rubber layer 14 laminated on an outer side of the resin barrier layer 12, and an inner rubber layer 16 laminated on an inner side of the resin barrier layer 12 defining an inner surface layer of the hose 10. The multilayer structure is formed throughout from one end or extremity to the other end or extremity of the hose 10.

Here, the hose 10 entirely has a curved or bent shape.

Specifically, the hose 10 has curved portions 10-1, 10-2 and 10-3 at predetermined axial or longitudinal positions of the hose 10. And, the hose 10 has straight portions or straight tubular portions (portions extending straight in the axial direction of the hose 10) 10-4 and 10-5 that are defined by axially opposite end portions of the hose 10. The hose 10 further has a straight portion 10-6 between the curved portions 10-1 and 10-2, and a straight portion 10-7 between the curved portions 10-2 and 10-3, respectively.

An inner diameter $ID_2$ and an outer diameter $OD_2$ of one axial end portion of the hose 10 are larger than an inner diameter $ID_1$ and an outer diameter $OD_1$ of the other axial end portion thereof, respectively.

In this embodiment, in the hose 10, each of the curved portions 10-1, 10-2 and 10-3 progressively and continuously increases both in the inner and outer diameters as approaching in the left direction in FIG. 2.

In this embodiment, acrylonitrile butadiene rubber (NBR) is used for the inner rubber layer 16, thermoplastic fluoro resin consisting of or consisting essentially of a terpolymer of tetrafluoroethylene, hexafluoropropylene, and vinylidene fluoride (THV) is used for the barrier layer 12, and NBR+PVC is used for the outer rubber layer 14.

Here, bond strength or adhesion strength between the layers (one and an adjacent layers) greater than 10N/25 mm, and the layers are bonded to each other firmly. Meanwhile, in each of samples evaluated with respect to bond strength, peel-off does not occur on an interface of each layer, but a parent material is destroyed.

The inner rubber layer 16, the barrier layer 12 and the outer rubber layer 14 may be made or constructed of the following materials, as well as the combination of the above materials.

Specifically, for the inner rubber layer 16, a material such as NBR (acrylonitrile content is equal to or greater than 30% by mass), NBR+PVC (acrylonitrile content is equal to or greater than 30% by mass), FKM, or hydrogenated acrylonitrile butadiene rubber (H-NBR) may be suitably used.

A wall-thickness of the inner rubber layer 16 may be around 1.0 to 2.5 mm.

For the barrier layer 12 as a middle layer, a material such as THV, a polyvinylidene fluoride (PVDF), ethylene-tetrafluoroethylene copolymer (ETFE), polychlorotrifluoroethylene (CTFE), ethylene-vinyl alcohol (EVOH), polybutylene naphthalate (PBN), polybutylene terephtharate (PBT), or polyphenylene sulfide (PPS) are suitably used.

A wall-thickness of the barrier layer 12 may be about 0.03 to 0.3 mm.

THV is flexible compared to EVOH and PVDF, and suitable for a barrier material for a hose with resin and rubber layers. In comparison with Polytetrafluoroethylene (PTFE) and EVOH, ETFE and THV are easily extruded, easily laminated to a rubber, and have excellent adhesion to rubber.

On the other hand, PBN and PBT are less flexible compared to THV. However, PBN and PBT are excellent in fuel permeation resistance, and can be thin-walled compared to THV. Therefore, a flexible hose can be formed also from PBN and PBT, similarly from THV.

On the other hand, for the outer rubber layer 14, a material such as NBR+PVC, epichlorohydrin-ethylene oxide copolymer (ECO), chlorosulponated polyethylene rubber (CSM), NBR+acrylic rubber (NBR+ACM), NBR+ethylene-propylene-diene rubber (NBR+EPDM), isobutylene-isoprene rubber or butyl rubber (IIR), EPDM or IIR+EPDM may be suitably used.

A wall-thickness of the outer rubber layer 14 may be about 1.0 to 3.0 mm.

In this embodiment, a rubber hardness of the outer rubber layer 14 is in a range equal to or lower than 75 degrees, a rubber hardness of the inner rubber layer 16 is in a range equal to or higher than 70 degrees, and the rubber hardness of the inner rubber layer 16 is higher than the rubber hardness of the outer rubber layer 14 by 10 degrees or more. However, as long as the rubber hardness of the inner rubber layer 16 is higher than the rubber hardness of the outer rubber layer 14, the rubber hardness of the outer rubber layer 14 or the rubber hardness of the inner rubber layer 16 may be set different value, and the difference between the rubber hardness of the inner rubber layer 16 and of the outer rubber layer 14 may be set different value.

Figure 3A:
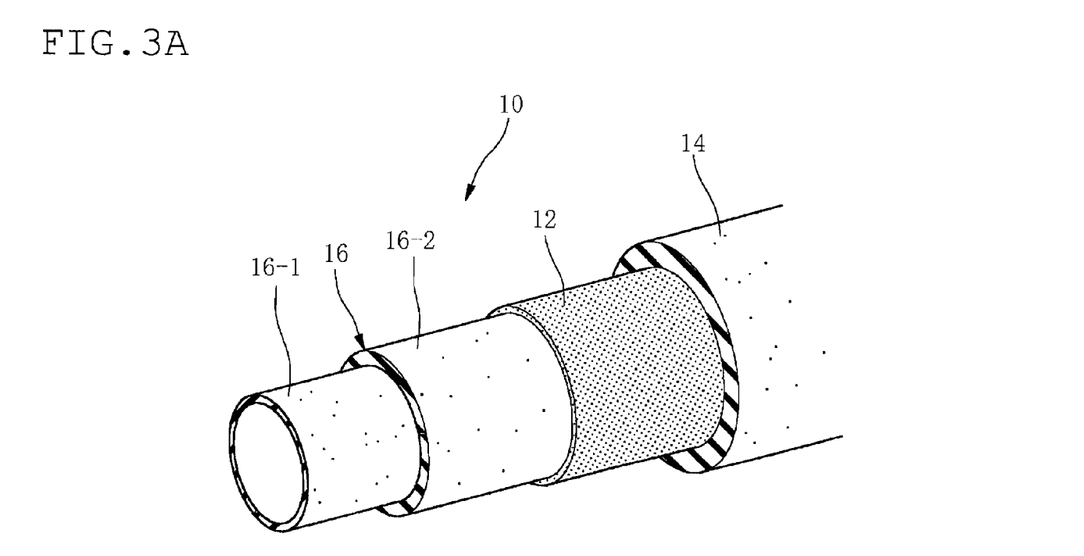
FIG. 3A is a perspective view of another filler hose according to the present invention, shown partly broken away.

According to this embodiment, in the hose 10, the inner rubber layer 16 consists of a single layer. However, as shown in FIG. 3A, the inner rubber layer 16 may have a two-layer structure that consists of a first layer (rubber layer) 16-1 defining an innermost surface and a second layer (rubber layer) 16-2 on an outer side of the first layer 16-1.

In this four-layer hose 10, bond strength between the layers (one and adjacent layers) is greater than 10N/25 mm, and the layers are bonded to each other firmly. In each of samples evaluated with respect to bond strength, peel-off does not occur on an interface of each layer, but a parent material is destroyed.

In this four-layer hose 10, materials for the layers may be combined as follows.

For the first layer 16-1, a material such as FKM, NBR (acrylonitrile content is equal to or greater than 30% by mass), or NBR+PVC (acrylonitrile content is equal to or greater than 30% by mass) may be suitably used.

A wall-thickness of the first layer 16-1 may be around 0.2 to 1.0 mm.

On the other hand, for the second layer 16-2, material such as NBR (acrylonitrile content is equal to or greater than 30% by mass) or NBR+PVC (acrylonitrile content is equal to or greater than 30% by mass) may be suitably used.

A wall-thickness of the second layer 16-2 may be around 1 to 2 mm.

In the embodiment as shown in FIG. 3A, a fuel can be effectively prevented from permeation through a fitted region of the hose 10 that is connected to a mating pipe, for example, by using FKM for the first layer 16-1. That is, an internal fuel can be prevented from permeation outwardly through the whole of the hose 10 by the middle barrier layer 12, and can be further prevented from permeation through the fitted region of the hose 10 by FKM having low permeability to fuel.

Meanwhile, the inner rubber layer 16 preferably has a wall-thickness equal to or greater than 1 mm at the fitted region of the hose 10 in view of easiness of fitting the hose 10 on the mating pipe. It makes a production cost of the hose 10 expensive to form the whole of the inner rubber layer 16 from FKM in a substantial thickness. However, in the embodiment as shown in FIG. 3A, the second layer 16-2 may be formed from NBR (acrylonitrile content is equal to or greater than 30% by mass) or NBR+PVC(acrylonitrile content is equal to or greater than 30% by mass). Since NBR is inexpensive compared to FKM, the hose 10 can be produced at low cost while maintaining low fuel-permeability at the fitted region of the hose 10.

In the embodiment of FIG. 3A, the middle barrier layer 12 and the outer rubber layer14 may be formed as stated above.

Also in this embodiment as shown in FIG. 3A, a rubber hardness of the outer rubber layer 14 is equal to or lower than 75 degrees, a rubber hardness of the inner rubber layer 16 is equal to or higher than 70 degrees, and the rubber hardness of the inner rubber layer 16 is higher than the rubber hardness of the outer rubber layer 14 by 10 degrees or more. However, as long as the rubber hardness of the inner rubber layer 16 is higher than the rubber hardness of the outer rubber layer 14, the rubber hardness of the outer rubber layer 14 or the rubber hardness of the inner rubber layer 16 may be set different value, and the difference between the rubber hardness of the inner rubber layer 16 and of the outer rubber layer 14 may be set different value.

Figure 3B:
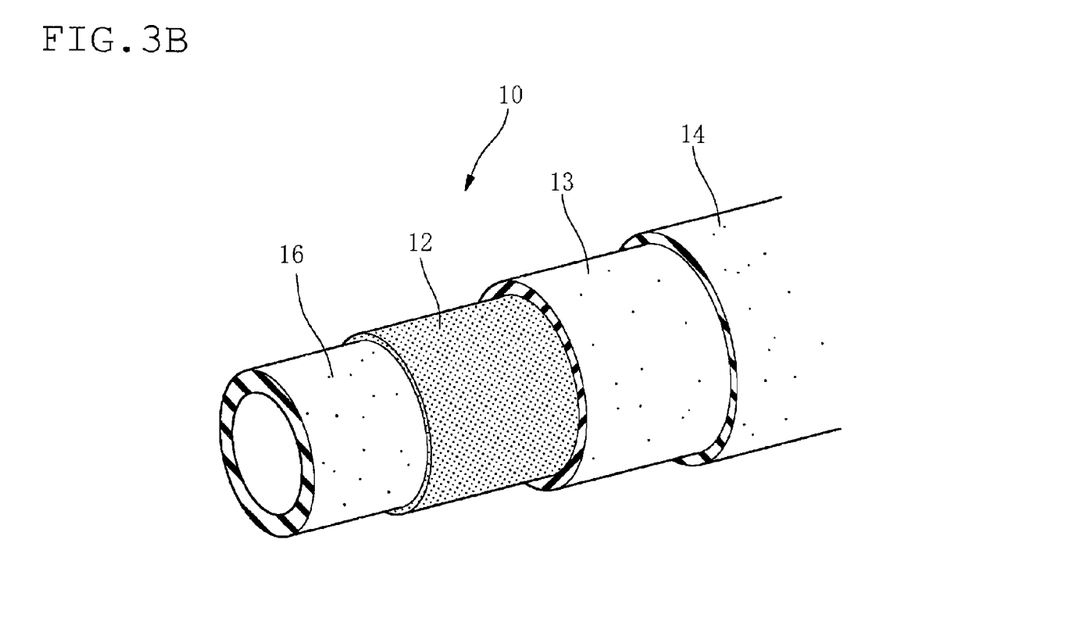
FIG. 3B is a perspective view of yet another filler hose according to the present invention, shown partly broken away.

FIG. 3B shows another embodiment of the hose 10 with four layer structure. As shown in this embodiment, the hose 10 may have a four layer structure including a middle rubber layer 13 between the resin barrier layer 12 and the outer rubber layer 14 (meanwhile, the layer 13 and the layer 14 may be regarded as an outer rubber layer. In this case, the layer 13 is a first layer of the outer rubber layer, and the layer 14 as an outermost layer of FIG. 3B is a second layer of the outer rubber layer).

In this four-layer hose 10, bond strength between the layers (one and adjacent layers) is greater than 10N/25 mm, and the layers are bonded to each other firmly. In each of samples evaluated with respect to bond strength, peel-off does not occur on an interface of each layer, but a parent material is destroyed.

The resin barrier layer 12 and the inner rubber layer 16, and the resin barrier layer 12 and the middle rubber layer 13 are bonded to one another by vulcanizing bonding, respectively, but may be also bonded to one another by adhesive.

In this four-layer hose 10, materials for the layers may be combined as follows.

For the inner rubber layer 16, FKM, NBR (acrylonitrile content is equal to or greater than 30% by mass), or NBR+PVC (acrylonitrile content is equal to or greater than 30% by mass) may be suitably used.

A wall-thickness of the inner rubber layer 16 may be around 0.2 to 1.0 mm.

For the resin barrier layer 12 as a middle layer, fluoro type resin such as THV, PVDF or ETFE, and polyamide resin such as PA6, PA66, PA11 or PA12 may be suitably used.

A wall-thickness of the resin barrier layer 12 may be about 0.03 to 0.3 mm.

On the other hand, for the middle rubber layer 13, a material such as NBR (acrylonitrile content is equal to or greater than 30% by mass), NBR+PVC (acrylonitrile content is equal to or greater than 30% by mass), ECO, CSM, NBR+ACM, NBR+EPDM, IIR, EPDM+IIR, or EPDM may be suitably used.

A wall-thickness of the middle rubber layer 13 may be about 0.2 to 2.0 mm.

For the outer rubber layer 14, NBR (acrylonitrile content is equal to or greater than 30% by mass), NBR+PVC (acrylonitrile content is equal to or greater than 30% by mass), ECO, CSM, NBR+ACM, NBR+EPDM, IIR, EPDM+IIR, or EPDM may be suitably used.

A wall-thickness of the outer rubber layer 14 may be about 1 to 3 mm.

Meanwhile, total wall-thickness, namely a suitable wall-thickness of the hose 10 of FIG. 3B is about 2.5 to 6.0 mm. When the wall-thickness of the hose 10 is smaller than 2.5 mm, a fuel (gasoline) permeation resistance of the hose 10 is insufficient. When the wall-thickness of the hose 10 is greater than 6 mm, flexibility of the hose 10 is insufficient.

Also in this embodiment as shown in FIG. 3B, a rubber hardness of the outer rubber layer 14 is equal to or lower than 75 degrees, a rubber hardness of the inner rubber layer 16 is equal to or higher than 70 degrees, and the rubber hardness of the inner rubber layer 16 is higher than the rubber hardness of the outer rubber layer 14 by 10 degrees or more. And, a rubber hardness of the middle rubber layer 13 may be equal to or lower than 75 degrees and the rubber hardness of the inner rubber layer 16 may be higher than the rubber hardness of the middle rubber layer 13 by 10 degrees or more. However, as long as the rubber hardness of the inner rubber layer 16 is higher than the rubber hardness of the outer rubber layer 14 and the middle rubber layer 13, the rubber hardness of the outer rubber layer 14, the middle rubber layer 13 or the inner rubber layer 16 may be set different value, and the difference between the rubber hardness of the inner rubber layer 16 and the outer rubber layer 14, or the difference between the rubber hardness of the inner rubber layer 16 and the middle rubber layer 13 may be set different value, respectively.

Here, when the outer rubber layer 14 (the second layer of the outer rubber layer) and/or the middle rubber layer 13 (the first layer of the outer rubber layer) is made of IIR or EPDM+IIR, the outer rubber layer 14 and/or the middle rubber layer 13 is provided with a gasoline fuel permeation resistance, and serves as a barrier layer since IIR and EPDM+IIR have alcohol resistance. Therefore, even when the resin barrier layer 12 is formed thin-walled to enhance flexibility or elasticity of the hose 10, gasoline fuel permeation resistance of the hose 10 does not become insufficient.

And, even when the resin barrier layer 12 is made of inexpensive PA instead of fluoro type resin having an excellent gasoline permeation resistance, sufficient gasoline fuel permeation resistance of the hose 10 can be maintained.

Then, the test samples of hoses including middle rubber layers made of IIR are evaluated with respect to gasoline permeation resistance and the results are shown in Table 1.

The evaluation is conducted in the following manner. Four test samples or specimens of hoses (A), (B), (C) and (D), each having an inner diameter of 24.4 mm, a wall-thickness of 4 mm, and a length of 300 mm, are prepared.

The test sample (A) has a three-layer structure including an inner rubber layer of NBR, a resin barrier layer of THV815 (THV815 is a product number of THV under the trademark Dyneon from Dyneon LLC), and an outer rubber layer of NBR+PVC, and the test sample (B) has a four-layer structure including an inner rubber layer of NBR, a resin barrier layer of THV815 (wall-thickness 0.11 mm), a middle rubber layer of IIR (a first layer of an outer rubber layer) and an outer rubber layer of NBR+PVC (a second layer of the outer rubber layer).

The test sample (C) has a four-layer structure including an inner rubber layer of NBR, a resin barrier layer of THV815 (wall-thickness 0.08 mm), a middle rubber layer of IIR (a first layer of an outer rubber layer) and an outer rubber layer of NBR+PVC (a second layer of an outer rubber layer), and the test sample (D) has a four-layer structure including an inner rubber layer of NBR, a resin barrier layer of PA11, a middle rubber layer of IIR (a first layer of an outer rubber layer) and an outer rubber layer of NBR+PVC (a second layer of the outer rubber layer).

In the columns of "Specimen" and "Wall-thickness" of Table 1, materials and wall-thicknesses only of the resin barrier layers and the middle rubber layers (with respect to the test sample (A), only of the resin barrier layer and the outer rubber layer) are indicated, respectively.

In each of the test samples (A), (B), (C) and (D), a round-chamfered metal pipe (mating pipe) of an outer diameter of 25.4 mm provided with two bulge portions (each having maximum outer diameter of 27.4 mm) is press-fitted in each end portion thereof, and one of the metal pipes is closed with a plug. And, a test fluid (Fuel C+Ethanol (E) 10 volume %) is supplied in each of the test samples (A), (B), (C) and (D) via the other of the metal pipes, and the other of the metal pipes is closed with a plug of screw type to enclose the test fluid in each of the test samples (A), (B), (C) and (D). Then, each of the test samples (A), (B), (C) and (D) is allowed to stand at 40° C. for 3000 hours (the test fluid is replaced every 168 hours). Then, permeation amount of carbon hydride (HC) is measured with respect to each of the test samples (A), (B), (C) and (D) every day for three days based on DBL (Diurnal Breathing Loss) pattern by a SHED (Sealed Housing for Evaporative Detection) method according to CARB (California Air Resources Board). With regard to each of the test samples (A), (B), (C) and (D), applied is a permeation amount of HC on a day when a maxim permeation amount of HC is detected.

TABLE 1

| | A | B | C | D |
|---|---|---|---|---|
| Specimen | THV815/ NBR + PVC | THV815/IIR | THV815/IIR | PA11/IIR |

TABLE 1-continued

|  | A | B | C | D |
| --- | --- | --- | --- | --- |
| Wall-thickness (mm) | 0.11/2.16 | 0.11/1.9 | 0.08/1.9 | 0.20/1.9 |
| Permeation amount (mg/hose) | 4.2 | 2.7 | 4.2 | 3.8 |

As stated, when a hose is constructed of four layers by combining materials suitably selected from the above, low permeability to a transported fluid can be further enhanced, or resistance to a sour gasoline can be further enhanced, or a heat resistance and a resistance to alcohol gasoline can be enhanced in a fuel transporting hose.

In the above embodiment, the present invention is applied for a hose having one axial end portion that is larger in diameter than the other axial end portion thereof. However, the present invention may be applied also for a hose having one axial end portion that is equal in diameter to the other axial end portion thereof.

According to the embodiment as stated above, when an end portion of the hose 10 is fitted on the mating pipe and the end portion of the hose 10 is tightened by a hose clamp, an inner peripheral surface of the end portion of the hose 10 can be clamped on an outer peripheral surface of the mating pipe in close contact with each other under uniform and required surface pressure throughout an entire circumference thereof, and thereby desired sealing performance can be ensured.

In the present embodiment, since the outer rubber layer 14 (or the outer rubber layer 14 and the middle rubber layer 13) is formed from a soft rubber material that has a low rubber hardness and has high deformability when an outer peripheral surface of an end portion of the hose 10 is tightened by the hose clamp, the outer rubber layer 14 (or the outer rubber layer 14 and the middle rubber layer 13) is favorably deformed following tightening action of the hose clamp, distortion is prevented from being generated on the outer peripheral surface of the outer rubber layer 14 and being transmitted to the hard resin barrier layer 12 in the middle in a thickness direction of the hose 10 and the inner rubber layer 16 on the inner side of the resin barrier layer 12 via the outer rubber layer 14 (or the outer rubber layer 14 and the middle rubber layer 13).

As a result, it is allowed to diametrically contract the resin barrier layer 12 in the middle in the cross-section of the hose 10 and the inner rubber layer 16 on the inner side of the resin barrier layer 12 by the tightening force of the hose clamp uniformly throughout the entire circumference thereof, and to contact closely the inner peripheral surface of the hose 10, namely, an inner peripheral surface of the inner rubber layer 16 with the outer peripheral surface of the mating pipe uniformly throughout the entire circumference thereof.

Moreover, since the inner rubber layer 16 is formed from a rubber material having a higher rubber hardness compared to the outer rubber layer 14 (or the outer rubber layer 14 and the middle rubber layer 13), when the inner rubber layer 16 is tightened slightly, a high surface pressure can be generated between the outer peripheral surface of the mating pipe and the inner peripheral surface of the inner rubber layer 16, and the inner rubber layer 16 is allowed to tighten the mating pipe firmly throughout the entire circumference thereof.

Thereby high sealing performance can be ensured between the end portion of the hose 10 and the mating pipe as desired.

Examples and comparison examples with respect to the hose 10 of multilayer structure as shown in FIGS. 1 and 2 are prepared. The examples and the comparison examples are prepared by varying combination with respect to a rubber hardness of an outer rubber layer and a rubber hardness of an inner rubber layer, each of the examples and the comparison examples is measured and evaluated with respect to properties such as sealing performance, easiness of fitting a hose on a mating pipe, and low permeability or permeability to fuel (gasoline). The results are shown in Tables 2 and 3.

With regard to the sealing performance, each of the examples and the comparison examples is measured and evaluated at an initial stage and after a thermal loading is applied. The thermal loading is applied in a following procedure. A fuel, namely Fuel C+E10 is enclosed in each example/comparison example, and it is allowed to stand at 60° C. for 168 hours. Then the fuel is withdrawn or discarded from it, and it is allowed to stand at 100° C. for 500 hours.

The fuel used here is composed of 45% by weight of isooctane, 45% by weight of toluene and 10% by weight of ethanol.

Meanwhile, a resin barrier layer of each of the examples and the comparison examples in Tables 2 and 3 has a flexural modulus of 500 MPa measured according to JIS K7171.

Specifically, the above tests with respect to the sealing performance, the easiness of fitting the hose, and the fuel permeation resistance are carried out as follows.

Sealing Performance

An opening of each of the examples and the comparison examples (filler hoses) is plugged with a metal (SUS) plug with a bulge portion (an annular bulged portion, an outer diameter of the bulge portion is 27.0 mm, an outer diameter of the plug is 25.4 mm). Then, a plugged portion of the filler hose is tightened by a worm-gear type (a screw-type) hose clamp with a torque at 2 Newton-meters (Nm), the filler hose is allowed to stand for one hour or more in an atmosphere of 80° C. and for one hour or more in an atmosphere of −40° C., then, nitrogen (gas) is charged in the filler hose at a pressure increase rate of 0.1 MPa/minute, and leakage of the nitrogen (gas) through between the metal plug and the filler hose is checked. In this manner, the sealing performance is evaluated.

Easiness of Fitting the Hose

A filler hose of each of the examples and the comparison examples is cut to 50 mm in length. A load measuring equipment (load cell) is attached to the metal plug, a pipe (mating pipe) is inserted in the fuel hose at a constant speed of 50 mm/minute in a room temperature, and the easiness of fitting the hose on the pipe is evaluated in terms of load for insertion of the pipe.

Fuel (Gasoline) Permeability (Low Permeability to Fuel (Gasoline))

A fuel (Fuel C+E10) is enclosed in each of the examples and the comparison examples (filler hoses) and an opening of each of the filler hoses is plugged with a metal (SUS) plug with a bulge portion (an outer diameter of the bulge portion is 27.0 mm, an outer diameter of the plug is 25.4 mm). Then, the filler hose is tightened by a worm-gear type hose clamp with a torque at 2 Nm, is allowed to stand in an atmosphere of 40° C. And, every 168 hours its weight is measured to calculate its weight decrease, and an enclosed liquid (the fuel, namely Fuel C+E10) is replaced until 2000 hours have passed.

TABLE 2

|  |  |  |  | Comparison Example 1 | Comparison Example 2 | Comparison Example 3 |
|---|---|---|---|---|---|---|
| Hose spec. |  |  | Structure | NBR + PVC(AN = 43)/THV815G/ NBR + PVC(AN = 37.5) | | |
| Test item | Test condition | | Target value | Measured value | | |
| Material Properties Inner rubber layer rubber hardness | (HA) | | | — | 65 | 70 | 75 |
| Material Properties Outer rubber layer rubber hardness | (HA) | | | — | 65 | 70 | 75 |
| Gasoline permeability | (mg/day/hose) | Fuel C + E10 60° C. × 2000 h | 10 or less | 22.1 | 23.4 | 22 |
| Easiness of fitting of hose (N) | Test speed 50 mm/min metal pipe | Initial stage | 200 or less | 150 | 190 | 220 |
| Sealing performance (kPa) | −40° C. and +80° C. | Initial stage | 80° C. | No leakage at 50 kPa | leakage at 30 | No leakage at 200 | No leakage at 200 |
|  |  |  | −40° C. |  | — | No leakage at 200 | No leakage at 200 |
|  |  | FuelC + E10 After thermal loading 60° C. × 168 h→ 100° C. × 500 h | 80° C. |  | leakage at 30 | Leakage at 30 | Leakage at 80 |
|  |  |  | −40° C. |  | — | Leakage at 50 | Leakage at 50 |

|  |  |  |  | Comparison Example 4 | Comparison Example 5 |
|---|---|---|---|---|---|
| Hose spec. |  |  | Structure | NBR + PVC(AN = 43)/ THV815G/NBR + PVC(AN = 37.5) | |
| Test item | Test condition | | Target value | Measured value | |
| Material Properties Inner rubber layer rubber hardness | (HA) | | | — | 70 | 75 |
| Material Properties Outer rubber layer rubber hardness | (HA) | | | — | 65 | 70 |
| Gasoline permeability | (mg/day/hose) | Fuel C + E10 60° C. × 2000 h | 10 or less | 14.9 | 16.1 |
| Easiness of fitting of hose (N) | Test speed 50 mm/min metal pipe | Initial stage | 200 or less | 160 | 200 |
| Sealing performance (kPa) | −40° C. and +80° C. | Initial stage | 80° C. | No leakage at 50 kPa | No leakage at 200 | No leakage at 200 |
|  |  |  | −40° C. |  | No leakage at 200 | No leakage at 200 |
|  |  | FuelC + E10 After thermal loading 60° C. × 168 h→ 100° C. × 500 h | 80° C. |  | leakage at 120 | Leakage at 100 |
|  |  |  | −40° C. |  | leakage at 150 | Leakage at 150 |

TABLE 2-continued

|  |  |  | Example 1 | Example 2 | Example 3 |
|---|---|---|---|---|---|
| Hose spec. |  | Structure | NBR + PVC(AN = 43)/THV815G/ NBR + PVC(AN = 37.5) | | |

| Test item | Test condition |  | Target value | Measured value | | |
|---|---|---|---|---|---|---|
| Material Properties Inner rubber layer rubber hardness | (HA) |  | — | 75 | 85 | 85 |
| Material Properties Outer rubber layer rubber hardness | (HA) |  | — | 65 | 75 | 65 |
| Gasoline permeability | (mg/day/ hose) | Fuel C + E10 60° C. × 2000 h | 10 or less | 9.2 | 9.2 | 8.7 |
| Easiness of fitting of hose (N) | Test speed 50 mm/min metal pipe | Initial stage | 200 or less | 160 | 180 | 170 |
| Sealing performance (kPa) | −40° C. and +80° C. | Initial stage | 80° C. No leakage at 50 kPa | No leakage at 200 | No leakage at 200 | No leakage at 200 |
|  |  |  | −40° C. | No leakage at 200 | No leakage at 200 | No leakage at 200 |
|  |  | FuelC + E10 After thermal loading 60° C. × 168 h→ 100° C. × 500 h | 80° C. | leakage at 140 | Leakage at 130 | Leakage at 100 |
|  |  |  | −40° C. | leakage at 150 | Leakage at 150 | Leakage at 150 |

TABLE 3

|  |  |  | Comparison Example 6 | Comparison Example 7 | Comparison Example 8 |
|---|---|---|---|---|---|
| Hose spec. |  | Structure | FKM/THV815G/NBR + PVC(AN = 37.5) | | |

| Test item | Test condition |  | Target value | Measured value | | |
|---|---|---|---|---|---|---|
| Material Properties Inner rubber layer rubber hardness | (HA) |  | — | 70 | 70 | 75 |
| Material Properties Outer rubber layer rubber hardness | (HA) |  | — | 70 | 65 | 70 |
| Gasoline permeability | (mg/day/ hose) | Fuel C + E10 60° C. × 2000 h | 5 or less | 6.3 | 6.9 | 9.1 |
| Easiness of fitting of hose (N) | Test speed 50 mm/min metal pipe | Initial stage | 200 or less | 190 | 160 | 200 |
| Sealing performance (kPa) | −40° C. and +80° C. | Initial stage | 80° C. No leakage at 50 kPa | No leakage at 200 | No leakage at 200 | No leakage at 200 |
|  |  |  | −40° C. | No leakage at 200 | No leakage at 200 | No leakage at 200 |
|  |  | FuelC + E10 After thermal loading 60° C. × 168 h→ 100° C. × 500 h | 80° C. | No leakage at 200 | No leakage at 200 | No leakage at 200 |
|  |  |  | −40° C. | Leakage at 150 | Leakage at 150 | Leakage at 150 |

TABLE 3-continued

| | | | | Example 4 | Example 5 |
|---|---|---|---|---|---|
| Hose spec. | | | Structure | FKM/THV815G/NBR + PVC (AN = 37.5) | |
| Test item | Test condition | | Target value | Measured value | |
| Material Properties Inner rubber layer rubber hardness | (HA) | | — | 75 | 80 |
| Material Properties Outer rubber layer rubber hardness | (HA) | | — | 65 | 70 |
| Gasoline permeability | (mg/day/hose) | Fuel C + E10 60° C. × 2000 h | 10 or less | 4.2 | 4.4 |
| Easiness of fitting of hose (N) | Test speed 50 mm/min metal pipe | Initial stage | 200 or less | 160 | 180 |
| Sealing performance (kPa) | −40° C. and +80° C. | Initial stage | 80° C. No leakage at 50 kPa | No leakage at 200 | No leakage at 200 |
| | | | −40° C. | No leakage at 200 | No leakage at 200 |
| | | FuelC + E10 After thermal loading 60° C. × 168 h → 100° C. × 500 h | 80° C. | No leakage at 200 | No leakage at 200 |
| | | | −40° C. | leakage at 150 | Leakage at 150 |

In Table 2, filler hoses (Comparison Examples 1 to 3), each including the outer rubber layer and the inner rubber layer that do not satisfy the basic conditions of a rubber hardness (the rubber hardness of the inner rubber layer is higher than the rubber hardness of the outer rubber layer) are insufficient at least in one of the sealing performance, the gasoline permeability (low permeability to gasoline) and the easiness of fitting the hose. Particularly, with respect to the sealing performance and the gasoline permeability, the target values are not achieved in all of Comparison Examples 1 to 3.

On the contrary, filler hoses (Examples 1 to 3), each including the inner rubber layer and the outer rubber layer that satisfy the additional conditions of a rubber hardness (more preferable conditions of a rubber hardness: the rubber hardness of the inner rubber layer is higher than the rubber hardness of the outer rubber layer by 10 degrees or more, or the rubber hardness of the inner rubber layer is higher than the rubber hardness of the outer rubber layer by 10 degrees or more, the rubber hardness of the inner rubber layer is equal to or higher than 70 degrees and the rubber hardness of the outer rubber layer is equal to or lower than 75 degrees) are good in all of the properties, namely the sealing performance, the gasoline permeability (low permeability to gasoline) and the easiness of fitting the hose.

Meanwhile, a filler hose including the outer rubber layer of the rubber hardness of 65 degrees and the inner rubber layer of the rubber hardness of 70 degrees (here, the filler hose is stated as a comparison example (Comparison Example 4) based on the additional conditions) does not satisfy the additional conditions. Nevertheless, Comparison Example 4 achieves the target value in the test for the sealing performance, but does not achieve the target value in the test for the gasoline permeability.

In the test for the gasoline permeability, gasoline leakage is detected if there is a slight sealing defect that cannot be detected in the test for the sealing performance. Therefore, the test for the gasoline permeability serves at the same time as another test for a sealing performance in which particularly a slight leakage is detected.

A filler hose including the outer rubber layer of the rubber hardness of 65 degrees and the inner rubber layer of the rubber hardness of 70 degrees does not meet the test for the gasoline permeability. This means that the filler hose is insufficient also in the sealing performance. However, when a filler hose that does not meet the test for the gasoline permeability achieves the target value or a value exceeding the target value in the sealing performance, the filler hose may be regarded acceptable.

This also applies to a filler hose including the outer rubber layer of the rubber hardness of 70 degrees and the inner rubber layer of the rubber hardness of 75 degrees (the filler hose is stated as a comparison example (Comparison Example 5) based on the additional conditions).

Although Comparison Examples 4 and 5 are indicated as "Comparison Example", they fall within the scope of the claims.

In table 3, the filler hoses, each including the inner rubber layer and the outer rubber layer that does not satisfy the additional conditions of a rubber hardness, do not meet the test for the gasoline permeability and are insufficient in the sealing performance.

On the contrary, the filler hoses (Example 4 and Example 5), each including the inner rubber layer and the outer rubber layer that satisfy the additional conditions of a rubber hardness are good in all of properties.

The reason why different target values are given for the gasoline permeability in Table 2 and Table 3 (10 or less in Table 2, and 5 or less in Table 3) is as follows. Each of the filler hoses shown in Table 3 includes the inner rubber layer made of FKM while each of the filler hoses shown in Table 2 includes the inner rubber layer made of NBR+PVC. The filler hoses in Table 3 are high-grade for meeting more strictly to restriction of fuel permeation compared to the fuller hose in Table 2. For this reason, the target value of the gasoline permeability is set 5 or less in Table 3. In view of cost, needless to say, the filler hoses shown in Table 3 are expensive. Here, in the test for the gasoline permeability, a filler hose (Comparison Example 6) that does not satisfy the basic conditions (the rubber hardness of the inner rubber layer is higher than the rubber hardness of the outer rubber layer) shows the same result as filler hoses (Comparison Example 7 and Comparison Example 8: Although Comparison Examples 7 and 8 are indicated as "Comparison Example", they fall within the scope of the claims.) that satisfy the basic conditions but do not satisfy the additional conditions, or in the test for the gasoline permeability, Comparison Example 6 rather shows a better result than Comparison Example 7 and Comparison Example 8. Since all of Comparison Examples 6 to 8 show the sealing performance exceeding the target value, these Comparison Example 6 to 8 can be regarded as acceptable hoses. However, in a filler hose including an inner rubber layer made of an excellent low gasoline-permeable material such as FKM, the filler hose may not show an improved result of the test for the gasoline permeability simply due to a rubber hardness of the inner rubber layer that is higher than a rubber hardness of an outer rubber layer. That is, in a filler hose including an inner rubber layer made of a material having not so excellent low permeability to gasoline as FKM (for example, made of NBR+PVC), the filler hose may be effectively improved in low permeability to gasoline due to a rubber hardness of the inner rubber layer that is higher than a rubber hardness of an outer rubber layer. Meanwhile, in Tables 2 and 3, AN=43 and AN=37.5 mean "acrylonitrile content is equal to or greater than 43% by mass" and "acrylonitrile content is equal to or greater than 37.5% by mass" respectively.

Although the preferred embodiments have been described above, these are only some of embodiments of the present invention.

For example, although the filler hose or the fuel hose of the above embodiments does not include a corrugated portion, as the case may be, the present invention may be adapted for a filler hose or a fuel hose including the corrugated portion. Or, for example, the present invention may be adapted for a filler hose or a fuel hose having two or more than two outer rubber layers. As stated, the present invention can be embodied by a variety of modifications without departing from the scope of the invention.

What is claimed is:

1. A fuel hose for a fuel pipeline in a motor vehicle, comprising:
   a multilayer structure including a resin barrier layer having low permeability to fuel, an outer rubber layer laminated on an outer side of the barrier layer and an inner rubber layer laminated on an inner side of the barrier layer and defining an inner surface layer of the fuel hose, the multilayer structure being formed throughout an entire length of the fuel hose:
   wherein a rubber hardness of the inner rubber layer is higher than a rubber hardness of the outer rubber layer;
   wherein the fuel hose further comprises a curved portion at a certain axial position thereof, one axial end portion of the fuel hose being larger in diameter than the other axial end portion thereof; and,
   wherein the curved portion is formed in a shape of continuously increasing diameter toward one end of the curved portion.

2. The fuel hose as set forth in claim 1, wherein the rubber hardness of the inner rubber layer is higher than the rubber hardness of the outer rubber layer to 10 degrees or more.

3. The fuel hose as set forth in claim 1, wherein the rubber hardness of the inner rubber layer is 70 degrees or higher and the rubber hardness of the outer rubber layer is 75 degrees to lower.

4. A filler hose for transporting a fuel to a fuel tank of a motor vehicle, comprising:
   a multilayer structure including a resin barrier layer having low permeability to fuel, an inner rubber layer laminated on an inner side of the barrier layer and defining an inner surface layer of the filler hose, and an outer rubber layer laminated on an outer side of the barrier layer, the multilayer structure being formed from one axial end to the other axial end of the filler hose;
   wherein a rubber hardness of the outer rubber layer is 75 degrees or lower, a rubber hardness of the inner rubber layer is 70 degrees or higher, and the rubber hardness of the inner rubber layer is higher than the rubber hardness of the outer rubber layer by 10 degrees or more;
   wherein the filler hose further comprises a curved portion at a certain axial position thereof, one axial end portion of the filler hose being larger in diameter than the other axial end portion thereof;
   wherein the curved portion is formed in a shape of continuously increasing diameter toward one end of the curved portion.

5. The fuel has as set forth in claim 1, wherein the curved portion comprises a plurality of curved portions formed at axially spaced positions.

6. The filler hose as set forth in claim 4, wherein the curved portion comprises a plurality of curved portions formed at axially spaced positions.

* * * * *